Figure 1:
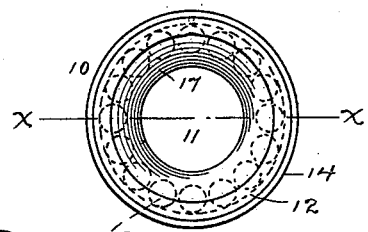
Figure 2:
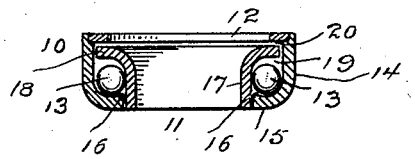
Figure 3:
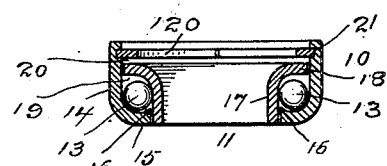
Figure 4:
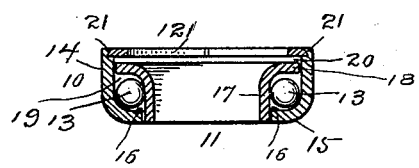
Figure 5:
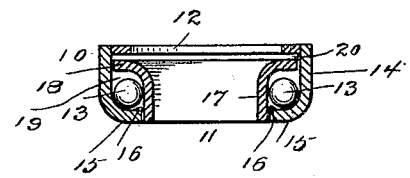
Figure 6:
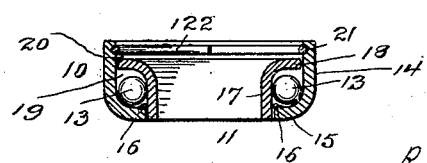

No. 886,950. PATENTED MAY 5, 1908.
R. G. CORNFORTH.
BALL BEARING.
APPLICATION FILED MAY 6, 1907.

WITNESSES
H. A. Lamb.
S. W. Atherton.

INVENTOR
Robert G. Cornforth
BY
A. M. Wooster
ATTORNEY

UNITED STATES PATENT OFFICE.

ROBERT G. CORNFORTH, OF SEYMOUR, CONNECTICUT.

BALL-BEARING.

No. 886,950.   Specification of Letters Patent.   Patented May 5, 1908.

Application filed May 6, 1907. Serial No. 371,950.

*To all whom it may concern:*

Be it known that I, ROBERT G. CORNFORTH, a citizen of the United States, residing at Seymour, county of New Haven, State of Connecticut, have invented a new and useful Ball-Bearing, (Case B,) of which the following is a specification.

This invention has for its object to provide a ball bearing adapted for general use, in which the number of parts shall be reduced to the minimum and all of which may be easily and inexpensively formed from sheet metal and may be assembled and secured together in the quickest and least expensive manner possible.

With these ends in view I have devised the simple and novel three-part ball bearing of which the following description in connection with the accompanying drawing is a specification, reference characters being used to indicate the several parts.

Figure 1 is an elevation of my novel bearing; and Figs. 2, 3, 4, 5, and 6 are sections on the line $x$—$x$ in Fig. 1, illustrating slightly variant forms in which I have carried the invention into effect.

My novel bearing comprises three parts only and a set of balls.

The essential feature of the invention is that the balls lie between two members which are secured together by a ring lying wholly within and engaging the outer member and acting to retain the parts in the assembled position.

10 and 11 denote the members, 12 the ring and 13 the balls. Member 10 comprises a ring-shaped portion indicated by 14 which is provided with an inwardly-turned flange indicated by 15, at the edge of which on the inner side is a lip 16 which forms a cup to retain the balls before the parts are assembled. Member 11 consists of a ring-shaped portion indicated by 17 which is provided with an outwardly-turned flange 18 which lies loosely within ring-shaped portion 14 of member 10, thus forming between said members a ball race indicated by 19. The ring-shaped portion 14 of member 10 extends horizontally beyond the outwardly-turned flange 18 of member 11, forming a circular space or chamber 20 outside said flange which receives ring 12. This ring lies wholly within the said space, covers the joint between the members and retains the parts in the assembled position. The ring may engage the wall of the space with a drive fit, as in Figs. 2 and 5, or may be a spring ring and engage the wall of the space by its outward expansion, as at 120 in Figs. 3, 121 in Fig. 4, and 122 in Fig. 6. In the last mentioned forms a socket 21 may be formed in the wall of space 20 to receive the ring. In all of the forms members 10 is left free to rotate independently of member 11.

Having thus described my invention, I claim:

A ball bearing comprising an outer ring-shaped sheet metal member having an inwardly-turned flange with a lip on its inner edge, for the purpose set forth, an inner ring-shaped sheet metal member lying within said flange, said inner member having an outwardly-turned flange lying within the edge of the outer member whereby a ball race is formed between said members and a circular space or chamber is formed outside the flange of the inner member, a set of balls in said race and a ring inclosed in said space and engaging the outer member closely, leaving the inner member free to rotate independently thereof.

In testimony whereof I affix my signature, in presence of two witnesses.

ROBERT G. CORNFORTH.

Witnesses:
W. R. PEARSON,
R. M. PARSONS.